Patented Aug. 9, 1938

2,126,269

UNITED STATES PATENT OFFICE 2,126,269

PROCESS FOR TREATING RUBBER AND PRODUCT OBTAINED THEREBY

William E. Messer, Cheshire, Conn., assignor to United States Rubber Products, Inc., New York, N. Y., a corporation of Delaware No Drawing. Application January 16, 1937, Serial No. 121,017

23 Claims. (Cl. 18—53)

This invention relates to the treatment of rubber and to the production of vulcanized goods therefrom. More particularly the invention relates to a new class of vulcanization accelerators.

Broadly the invention comprises incorporating into rubber prior to vulcanization thereof a pyrimidine sulfide, the pyrimidine nucleus of which embodies a ring of 4 carbon atoms and 2 nitrogen atoms, one of said carbon atoms being intermediate the two nitrogen atoms and directly linked to a non-nuclear sulfur atom, and at least one of the other 3 nuclear carbon atoms being a carbon atom of a methylene group (substituted or unsubstituted).

Pyrimidine sulfides so constituted are vulcanization accelerators and may take various forms. Where the non-nuclear sulfur atom is directly linked to a non-nuclear hydrogen atom to form a carbosulfhydryl group, and one of the nuclear nitrogen atoms is doubly bonded to the carbon atom of the carbosulfhydryl group, as illustrated in Example I, the tautomeric formula may exist also and is an equivalent of the sulfhydryl compound within the broad purposes of the invention. The non-nuclear sulfur atom may form part of a group wherein the hydrogen of the sulfhydryl group is replaced by other radicals or groups, including metals, and denoted salts or esters of the sulfhydryl compound.

The following is illustrative of the invention without being restrictive thereto. The parts are by weight. T represents tensiles in lbs. per square inch at break, and E is percentage elongation at break.

EXAMPLE I 2-mercapto-3,4,5,6-tetrahydro pyrimidine

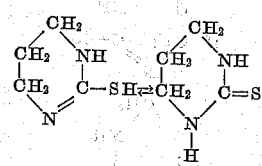

7 cc. carbon bisulfide are added to a solution of 8.5 gr. trimethylene diamine dissolved in 100 cc. water with shaking and cooling. On evaporation on a steam bath and recrystallization from chloroform, 13 g. of nearly white powder of M. R. 210-2° C. are obtained. Analysis shows 24% nitrogen and 27% sulfur.

The accelerator was tested in the following mix which was vulcanized in a press cure:

Stock

| | |
|---|---|
| Smoked sheets | 100 |
| Zinc oxide | 10 |
| Sulfur | 3 |
| Zinc salt of cocoanut oil acids | .5 |
| Accelerator | .35 |

Unaged tensiles

| Minutes cure at 40 lbs. sq. in. steam pressure | T | E |
|---|---|---|
| 15 | 2050 | 843 |
| 20 | 2230 | 816 |
| 30 | 2450 | 776 |
| 40 | 2540 | 760 |
| 50 | 2660 | 770 |
| 60 | 2740 | 753 |

Aged 48 hrs. in oxygen bomb (300 lbs. sq. in.) oxygen maintained at 70° C.

| Minutes cure at 40 lbs. sq. in. steam pressure | T | E |
|---|---|---|
| 15 | 1030 | 766 |
| 20 | 1100 | 776 |
| 30 | 1120 | 710 |
| 40 | 1100 | 723 |
| 50 | 230 | 496 |
| 60 | 120 | 270 |

The accelerator when tested in the following mix vulcanized in an air cure gave the results below:

Stock

| | |
|---|---|
| Pale crepe | 100 |
| Zinc oxide | 10 |
| Lithopone | 60 |
| Sulfur | 2 |
| Whiting | 50 |
| Zinc salt of cocoanut oil acids | .5 |
| Accelerator | .695 |

Unaged tensiles

| Minutes cure at 260° F. | T | E |
|---|---|---|
| 5 | 2200 | 630 |
| 15 | 2230 | 700 |
| 30 | 2340 | 306 |
| 45 | 2580 | 876 |
| 60 | 2330 | 690 |

*Aged 48 hours in oxygen bomb*

| Minutes cure at 260° F. | T | E |
|---|---|---|
| 5 | 2300 | 633 |
| 15 | 2550 | 636 |
| 30 | 2100 | 620 |
| 45 | 1940 | 620 |
| 60 | 1650 | 520 |

EXAMPLE II 2-mercapto-5-keto-tetrahydro-pyrimidine

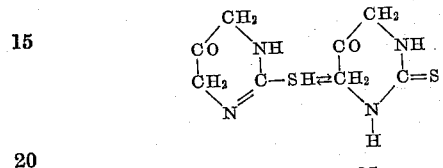

20 g. of thiourea and 35 g. of 1,3-dichlor acetone are heated in a flask with reflux condenser on a steam bath for about one hour. A vigorous reaction takes place. The product is taken up in alcohol and recrystallized giving 28 g. light yellow crystals of M. P. 258° (with decomposition).

The accelerator when tested in the following rubber mix vulcanized in a press cure gave the results below:

*Stock*

| | |
|---|---|
| Smoked sheet | 100 |
| Zinc oxide | 10 |
| Sulfur | 3 |
| Zinc salt of cocoanut oil acids | .5 |
| Accelerator | .39 |

*Unaged tensiles*

| Minutes cure at 40 lbs. sq. in. steam pressure | T | E |
|---|---|---|
| 15 | 40 | 893 |
| 20 | 120 | 976 |
| 30 | 480 | 976 |
| 40 | 800 | 960 |
| 50 | 840 | 930 |
| 60 | 1080 | 933 |

EXAMPLE III 2-mercapto-5-methyl tetrahydro pyrimidine

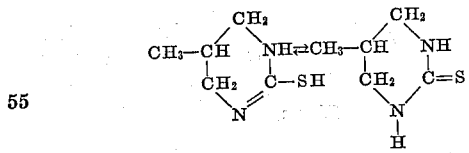

10 g. carbon bisulfide are slowly added to a solution of 10 g. crude 1,3-diamino isobutane in 100 cc. water and evaporated to dryness on a steam bath and crude products recrystallized from chloroform or water. 10 g. of nearly white powder of M. P. 221-3° C. are obtained. Analysis showed 25% sulfur and 21% nitrogen.

The accelerator when tested in the following rubber mix vulcanized in a press cure gave the results below:

*Stock*

| | |
|---|---|
| Smoked sheet | 100 |
| Zinc oxide | 10 |
| Sulfur | 3 |
| Zinc salt of cocoanut oil acids | .5 |
| Accelerator | .39 |

*Unaged tensiles*

| Minutes cure at 40 lbs. sq. in. steam pressure | T | E |
|---|---|---|
| 15 | 2240 | 833 |
| 20 | 2400 | 816 |
| 30 | 2530 | 790 |
| 40 | 2630 | 773 |
| 50 | 2650 | 786 |
| 60 | 2800 | 786 |

*Aged 48 hours in oxygen bomb*

| Minutes cure at 40 lbs. sq. in. steam pressure | T | E |
|---|---|---|
| 15 | 1700 | 850 |
| 20 | 1700 | 813 |
| 30 | 1260 | 710 |
| 40 | 1250 | 760 |
| 50 | 600 | 603 |
| 60 | 100 | 296 |

Other types of compounds related in properties to those given in Examples I to III are the following, in which ø stands for a phenyl nucleus:

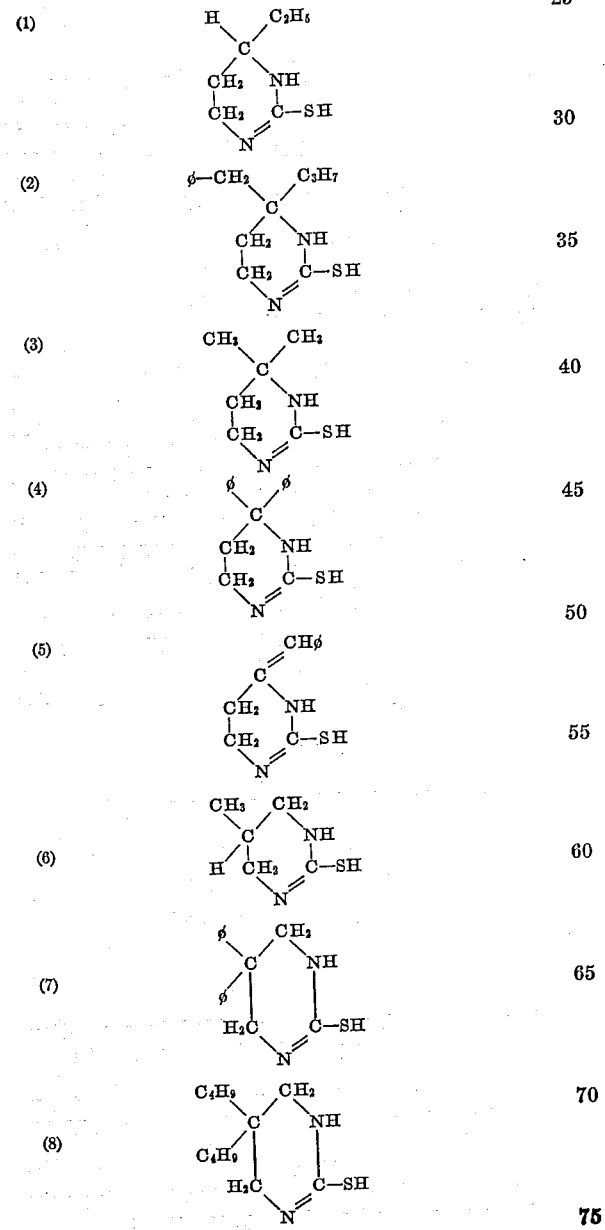

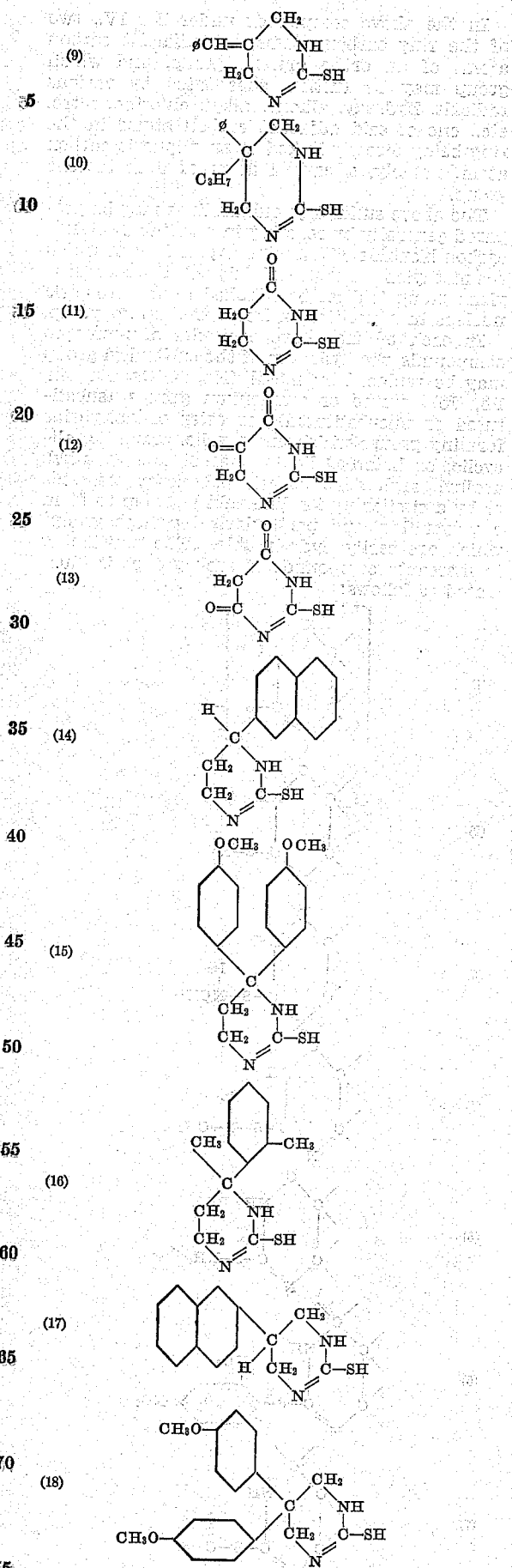

The above sulfhydryl pyrimidines may be prepared generally by reacting in a suitable solvent, carbon bisulfide with 1-3 diamines of trimethylene or appropriately substituted trimethylene group, or by reacting thiourea with 1,3 dichlor derivatives of trimethylene or appropriately substituted trimethylene group.

EXAMPLE IV 2-mercapto-3,4-dihydroquinazoline

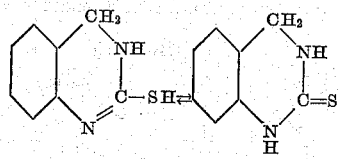

24 cc. carbon bisulfide are slowly added to a solution of 24 g. crude o-amino benzylamine in 250 cc. alcohol. Some heating occurs and crystals of mercapto quinazoline separate and are filtered off and dried. 24 g. crude product are obtained and are recrystallized several times from alcohol—discarding the less soluble portion—and finally 12 g. light yellow powder of M. P. 210° C. are obtained.

The accelerator when tested in the following rubber mix vulcanized in a press cure gave the results below:

Stock

| | |
|---|---|
| Smoked sheets | 100 |
| Zinc oxide | 10 |
| Sulfur | 3 |
| Zinc salt of cocoanut oil acids | .5 |
| Accelerator | .785 |

Unaged tensiles

| Minutes cure at 40 lbs. per sq. in. steam pressure | T | E |
|---|---|---|
| 15 | 1900 | 846 |
| 20 | 2160 | 863 |
| 30 | 2370 | 816 |
| 40 | 2440 | 786 |
| 50 | 2440 | 770 |
| 60 | 2450 | 776 |

Other types of compounds related in properties to that given in Example IV are the following in which ø stands for a phenyl nucleus:

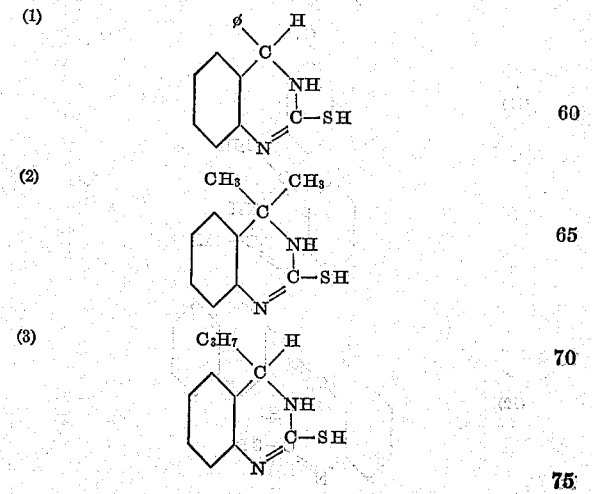

In the above compounds under Ex. IV., two of the ring carbon atoms are adjacent carbon atoms of an ortho arylene group, and which group may be further substituted by various radicals, hydroxy, alkoxy, alkyl, chlorine, nitro, etc., one of said adjacent carbon atoms in the ring being directly linked to an aliphatic carbon atom, namely, a carbon atom of a methylene group.

The above sulfhydryl quinazolines may be prepared generally by reacting in a suitable solvent, carbon bisulfide with amino arylamines in which the methylene or appropriately substituted methylene group is directly attached to the aromatic nucleus in a position ortho to the amino group.

In each of the above examples of mercapto compounds, the hydrogen of the sulfhydryl group may be replaced by metal (Na, K, Ca, Ba, Zn, Pb, Fe), amine or ammonium groups (substituted or unsubstituted), or ester or anhydride forming groups which are acyclic, aromatic, alicyclic, or heterocyclic in character, e. g. alkyl, aralkyl, aryl, acyl, aracyl, polymethylene, etc., or by a similar pyrimidine sulfide group to form a polysulfide, and particularly by those groups which are easily hydrolyzable. The positioning in mercapto compounds of such groups is illustrated as follows:

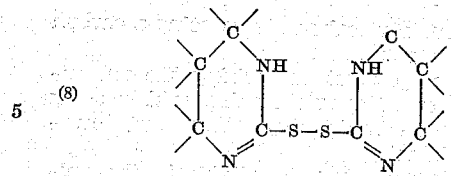
(8)

The nomenclature of such compounds will be apparent from the following specific illustrations:

(1) 2,2-bis(3,4,5,6-tetrahydro pyrimidyl) disulfide

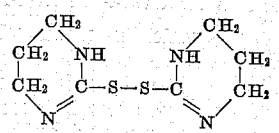

(2) Zinc 3,4,5,6-tetrahydropyrimidyl (2) sulfide

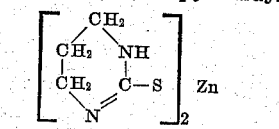

(3) Dinitro-phenyl 3,4,5,6-tetrahydro-pyrimidyl (2) sulfide

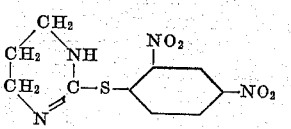

(4) Diphenyl carbamyl 3,4,5,6-tetrahydro pyrimidyl (2) sulfide

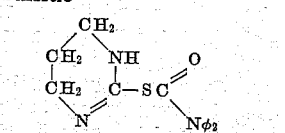

In the case of the various derivatives above (metallic, salt, ester, etc.), they may generally be prepared from the parent sulfhydryl compound in the same general manner that similar derivatives are prepared from 5-membered ring compounds such as the sulfhydryl thiazoles, for example, in the case of the alkali-metal salts they may be derived by reacting the metallic hydroxide with the sulfhydryl compound; the heavy metal salts by treating the alkali metal derivatives with solutions of the heavy metals; the esters by reacting the corresponding chloride with the sulfhydryl compound, etc.

Generally basic substituents attached to the heterocyclic pyrimidine nucleus or in the salt or ester forming group tend to reduce the factor of safety against scorching while acidic or negative substituents attached to the heterocyclic nucleus or in the salt or ester forming group tend to increase that factor. The desirability of introducing these various substituents will be governed by the kind and type of cure desired. In many cases it will be found that the type of stock and nature of cure desired governs the use or not of an activator amine and the use or not of a class of accelerator compound devoid of such basic or acidic substituents. In place of the activator zinc oxide, oxides of other metals and their salts may be used as is known in the art. Also in place of zinc salts of higher fatty acids, the higher fatty acids themselves may be used such as stearic, oleic, lauric, etc.

Various compounding ingredients such as fillers, pigments, softeners, anti-oxidants, anti-scorchers, or vulcanization retarders may be employed in practicing the invention. The accelerators may be used in the vulcanization of whole latex rubber or rubber recovered from latex by coagulation or separated from latex by mechanical or centrifugal creaming or chemical creaming methods as will be apparent to those skilled in the art.

The term "rubber" is to be construed broadly as including besides caoutchouc, reclaimed rubbers, gutta percha, balata, synthetic rubber, rubber isomers, etc., as well as natural or artificial rubber latices or aqueous dispersions of rubber. The methods of using the various accelerating agents herein set forth, as to the quantity employed, time of vulcanization, the heat required, and the proportions of metal oxide, sulphur and other ingredients may be varied without departing from the principle of the invention, as hereafter claimed.

Having thus described my invention, what I claim and desire to protect by Letters Patent is:

1. A process of producing a vulcanized rubber product which comprises incorporating in rubber a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, at least one of the other 3 nuclear carbon atoms being a carbon atom of a methylene group, and vulcanizing the rubber.

2. A process of producing a vulcanized rubber product which comprises incorporating in rubber a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, and each of the other 3 ring carbon atoms being a carbon atom of a methylene group, and vulcanizing the rubber.

3. A process of producing a vulcanized rubber product which comprises incorporating in rubber a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, one of the other 3 ring carbon atoms being a carbon atom of a methylene group, and the remaining 2 ring carbon atoms being adjacent carbon atoms of an arylene nucleus, and vulcanizing the rubber.

4. A process of producing a vulcanized rubber product which comprises incorporating in rubber, a vulcanizing agent, and a mercapto pyrimidine, the pyrimidine nucleus of which embodies a ring of 4 carbon atoms and 2 nitrogen atoms, one of said 4 ring carbon atoms being intermediate the 2 ring nitrogen atoms and directly linked to a non-nuclear mercapto sulfur atom, at least one of the other 3 nuclear carbon atoms being a carbon atom of a methylene group, and vulcanizing the rubber.

5. A process of producing a vulcanized rubber product which comprises incorporating in rubber, a vulcanizing agent, and a mercapto ortho-arylene-pyrimidine, and vulcanizing the rubber.

6. A process of producing a vulcanized rubber product which comprises incorporating in rubber, a vulcanizing agent, and a mercapto alkyl-substituted tetrahydro pyrimidine, and vulcanizing the rubber.

7. A composition comprising rubber and a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, at least one of the other 3 nuclear carbon atoms being a carbon atom of a methylene group.

8. A composition comprising rubber and a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, and each of the other 3 ring carbon atoms being a carbon atom of a methylene group.

9. A composition comprising rubber and a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, one of the other 3 ring carbon atoms being a carbon atom of a methylene group, and the remaining 2 ring carbon atoms being adjacent carbon atoms of an arylene nucleus.

10. A composition comprising rubber and a mercapto pyrimidine, the pyrimidine nucleus of which embodies a ring of 4 carbon atoms and 2 nitrogen atoms, one of said 4 ring carbon atoms being intermediate the 2 ring nitrogen atoms and directly linked to a non-nuclear mercapto sulfur atom, at least one of the other 3 nuclear carbon atoms being a carbon atom of a methylene group.

11. A composition comprising rubber and a mercapto alkyl-substituted tetrahydro pyrimidine.

12. A rubber product comprising the vulcanization product of a vulcanizable rubber stock containing a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, at least one of the other 3 nuclear carbon atoms being a carbon atom of a methylene group.

13. A rubber product comprising the vulcanization product of a vulcanizable rubber stock containing a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, and each of the other 3 ring carbon atoms being a carbon atom of a methylene group.

14. A rubber product comprising the vulcanization product of a vulcanizable rubber stock containing a pyrimidine sulfide, the pyrimidine nucleus of which embodies a ring of 4 carbon atoms and 2 nitrogen atoms, one of said 4 ring carbon atoms being intermediate the two ring nitrogen atoms and directly linked to a non-nuclear sulfur atom, one of the other 3 ring carbon atoms being a carbon atom of a methylene group, and the remaining 2 ring carbon atoms being adjacent carbon atoms of an arylene necleus.

15. A rubber product comprising the vulcanization product of a vulcanizable rubber stock containing a mercapto pyrimidine, the pyrimidine nucleus of which embodies a ring of 4 carbon atoms and 2 nitrogen atoms, one of said 4 ring carbon atoms being intermediate the 2 ring nitrogen atoms and directly linked to a non-nuclear mercapto sulfur atom, at least one of the other 3 nuclear carbon atoms being a carbon atom of a methylene group.

16. A rubber product comprising the vulcanization product of a vulcanizable rubber stock containing a mercapto alkyl-substituted tetrahydro pyrimidine.

17. As a new compound, suitable in the vulcanization of rubber, 2-mercapto-5-methyl tetrahydro pyrimidine.

18. A process of producing a vulcanized rubber product which comprises vulcanizing the rubber in the presence of a pyrimidine sulphide the pyrimidine nucleus of which embodies a heterocyclic ring of 4 carbon atoms and 2 nitrogen atoms, three of the ring carbon atoms being neighboring carbon atoms linking the two heterocyclic nitrogen atoms to each other, and only 2 of which neighboring carbon atoms may be part of a homocyclic ring system.

19. A rubber product in which the rubber contains prior to vulcanization a pyrimidine sulphide the pyrimidine nucleus of which embodies a heterocyclic ring of 4 carbon atoms and 2 nitrogen atoms, three of the ring carbon atoms being neighboring carbon atoms linking the two heterocyclic nitrogen atoms to each other, and only 2 of which neighboring carbon atoms may be a part of a homocyclic ring system.

20. A process of producing a vulcanized rubber product which comprises vulcanizing the rubber in the presence of a pyrimidine sulphide the pyrimidine nucleus of which embodies a heterocyclic ring of 4 carbon atoms and 2 nitrogen atoms in which the 2 heterocyclic nitrogen atoms are separated from each other on one side by 3 of said ring carbon atoms consecutively related, and on the other side by the remaining ring carbon atom which is directly joined to a non-nuclear sulphur atom, one of the consecutively related carbon atoms directly adjacent either one of the heterocyclic nitrogen atoms being the carbon atom of a methylene group.

21. A rubber product in which the rubber contains prior to vulcanization a pyrimidine sulphide the pyrimidine nucleus of which embodies a heterocyclic ring of 4 carbon atoms and 2 nitrogen atoms in which the 2 heterocyclic nitrogen atoms are separated from each other on one side by 3 of said ring carbon atoms consecutively related, and on the other side by the remaining ring carbon atom which is directly joined to a non-nuclear sulphur atom, one of the consecutively related carbon atoms directly adjacent either one of the heterocyclic nitrogen atoms being the carbon atom of a methylene group.

22. A process of producing a vulcanized rubber product which comprises vulcanizing the rubber in the presence of a pyrimidine sulphide the pyrimidine nucleus of which embodies a heterocyclic ring of 4 carbon atoms and 2 nitrogen atoms in which the two heterocyclic nitrogen atoms are linked to each other through 3 of the ring carbon atoms consecutively related, only two of which consecutively related carbon atoms may be part of a homocyclic ring.

23. A rubber product in which the rubber contains prior to vulcanization a pyrimidine sulphide the pyrimidine nucleus of which embodies a heterocyclic ring of 4 carbon atoms and 2 nitrogen atoms in which the two heterocyclic nitrogen atoms are linked to each other through 3 of the ring carbon atoms consecutively related, only two of which consecutively related carbon atoms may be part of a homocyclic ring.

WILLIAM E. MESSER.